J. RADEMACHER.
CHAIN GRATE.
APPLICATION FILED SEPT. 19, 1911.
1,028,276.
Patented June 4, 1912.
3 SHEETS—SHEET 1.
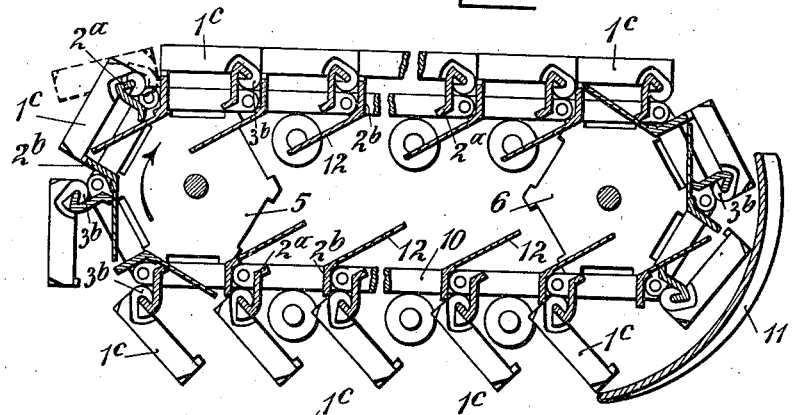
FIG. 1.
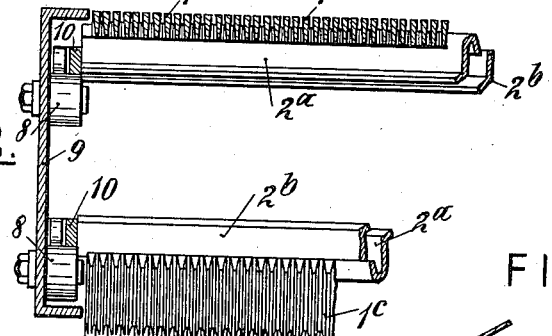
FIG. 2.
FIG. 3.
FIG. 5.
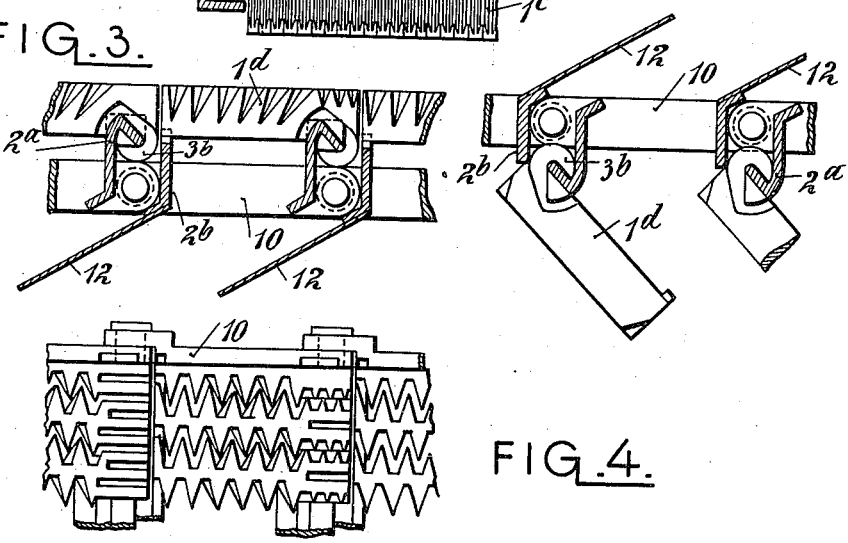
FIG. 4.
Witnesses:
Arthur L. Lean
Inventor:
John Rademacher
COLUMBIA PLANOGRAPH CO., WASHINGTON, D. C.

J. RADEMACHER.
CHAIN GRATE.
APPLICATION FILED SEPT. 19, 1911.
1,028,276.
Patented June 4, 1912.
3 SHEETS—SHEET 2.
FIG. 6.
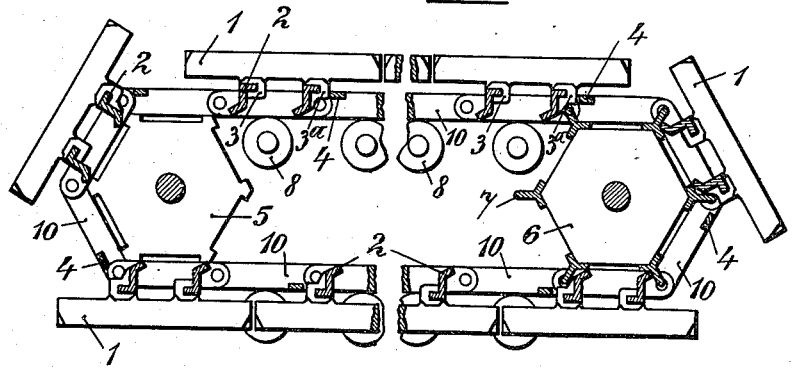
FIG. 7.
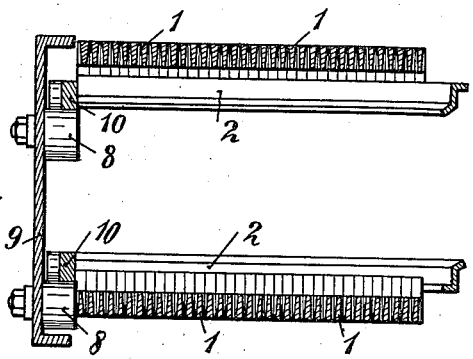
FIG. 8.
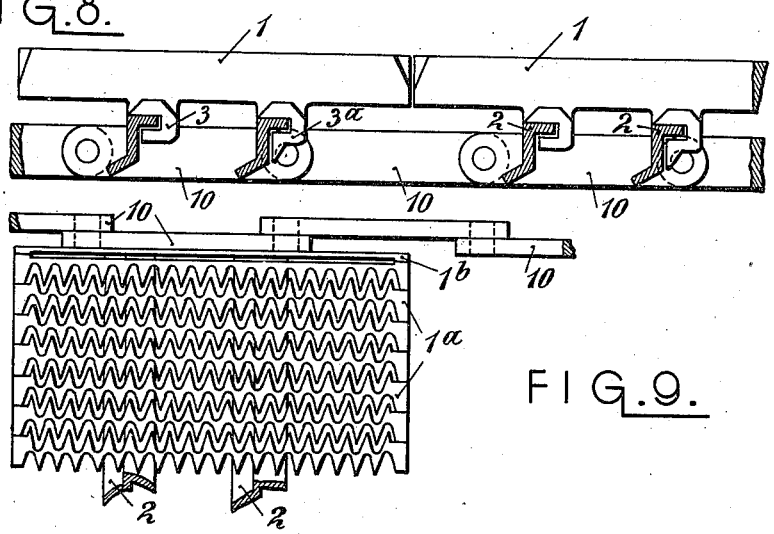
FIG. 9.
Witnesses:
Inventor:

J. RADEMACHER.
CHAIN GRATE.
APPLICATION FILED SEPT. 19, 1911.

1,028,276.

Patented June 4, 1912.
3 SHEETS—SHEET 3.

Witnesses:

Inventor:

UNITED STATES PATENT OFFICE.

JOHANN RADEMACHER, OF PANKOW, NEAR BERLIN, GERMANY.

CHAIN GRATE.

1,028,276.  Specification of Letters Patent.  Patented June 4, 1912.

Application filed September 19, 1911. Serial No. 650,172.

*To all whom it may concern:*

Be it known that I, JOHANN RADEMACHER, a subject of the German Emperor, and residing at Pankow, near Berlin, Germany, have invented certain new and useful Improvements in Chain Grates, of which the following is a specification.

My invention relates to chain-grate stokers.

More particularly my invention relates to that class of chain-grates in which the grate-bars are carried by crosspieces which in turn are carried by the links of the chain.

One of the objects of my invention is to provide a chain-grate of the class described with independently and separately removable grate-bars which are held in place and secured to the chain by suitable mechanism during their travel on the upper and lower paths of the grate and while rounding the rear grate-drum that is, during a part only of each revolution of a link of the chain, but which are left free and unlocked from the chain while rounding the front grate-drum in order that they may be removed and replaced.

In accordance with one form of my invention I provide suitable stops or crosspieces mounted on the chain-links and on the rear drum which hold the grate-bars securely in place while traveling on their upper and lower paths and around the rear drum. In another form, the grate-bars are rotatable relatively to the crosspieces which carry them and are kept from dropping away from their carriers by a suitable guide while rounding the rear drum. In this species of the invention I prefer to provide guards for the grate-bars to protect their lower surfaces from ashes. These guards consist preferably of inclined guide plates carried by the cross-bars of the chains. In a third form the grate-bars project beyond the links which carry them and during part of their path are locked by adjacent links co-acting with their projecting ends.

My invention consists in the parts, improvements and combinations more particularly described hereinafter and pointed out in the claims.

Figure 10:
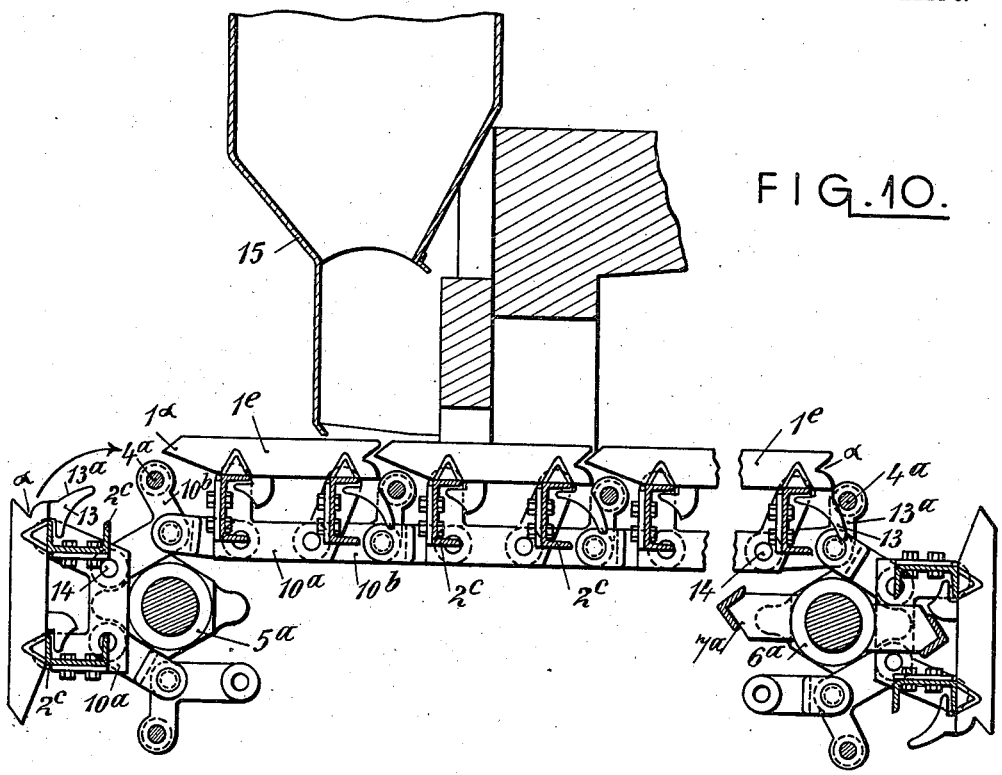
Figure 11:
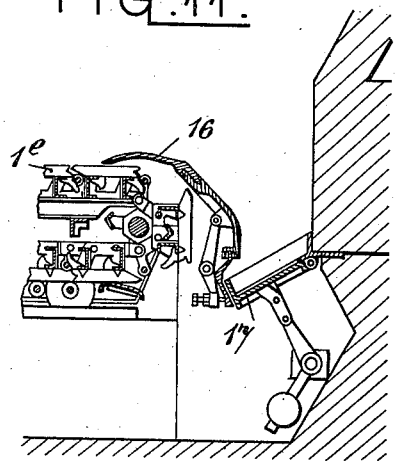

Referring now to the drawings which are attached to this specification and form a part thereof;—Figures 1 to 5 illustrate one species of the invention, in which the grate-bars are rotatably mounted on their carriers; Figs. 6 to 9 illustrate a second species in which the grate-bars are inserted in their carrier by sliding them onto their carriers without rotating them, and Figs. 9 and 10 illustrate a third species comprising grate-bars having specially shaped ends. In all the species, the grate-bars are removed by sliding them lengthwise. Fig. 1 shows a longitudinal section of my chain-grate, and Fig. 2 a cross-section of the same; Fig. 3 is a longitudinal section, enlarged, showing chain-links and modified grate-bars, Fig. 4 a plan view of the same when on the upper runway, and Fig. 5 a longitudinal section of the same when on the lower runway; Fig. 6 is a longitudinal section of a simplified species of my invention, Fig. 7 a cross-section of the same, Fig. 8 an enlarged longitudinal section of the same, and Fig. 9 a top plan view of a part of the simplified chain-grate, comprising a modified form of grate-bar, while on the upper runway; Fig. 10 is a longitudinal section of another form of grate according to my invention, and Fig. 11 is a like view of the rear end and of the latter grate and appertaining clinker-removing apparatus.

Referring firstly to Figs. 6 to 9 showing the second species of the invention, the length of the grate-bar in the form illustrated equals two links of the chain. Each grate-bar 1 is mounted on suitable carriers whose form may be widely varied. As illustrated two cross-bars 2 are used, but a single cross-bar of suitable section may be substituted therefor. The means for removably connecting the grate-bars to their carriers may be widely varied. As illustrated, the grate-bars are provided with hook-shaped projections 3 and 3$^a$ which are hooked over the cross-bars 2 (Figs. 6 and 8). In order to prevent displacement of the grate-bars on the upper and lower runways of the grates and to secure and lock the grate-bars to their carriers, stops are provided, preferably in the form of cross-bars 4. These stops lock the grate-bars to their carriers while on the upper and lower runways by coming into contact with the projections on the grate-bars and thus prevent longitudinal movement of the grate-bars with relation to their carriers. These stops are preferably mounted upon those guide links of the chain which are unprovided with carrying cross-bars. (Fig. 6.) As the grate-bars turn around the drum or wheel 5 (at which time they retain their position by gravity)

a gap is formed between adjacent grate-bars, the grate-bars are unlocked and may be readily inserted and removed (Fig. 6). Suitable means are provided for locking the grate-bars to their carriers and for preventing the grate-bars from dropping by gravity away from their carriers while rounding the rear chain-drum 6. These means may be varied. As illustrated, I provide stops in the form of ribs 7 on the drum 6 (Fig. 6) which come in front of and into contact with the downward projections $3^a$ of the grate-bars, after the stops 4 are disengaged therefrom. While traveling in their straight paths, the chain-links are supported by rollers 8 (Figs. 6 and 7) located in the frame 9. Straight grate-bars are readily removed and replaced while rounding the drum 5. If grate-bars $1^a$ having side projections which engage adjacent bars are used (see Fig. 9), they can then be removed and replaced singly and separately by providing a straight grate-bar $1^b$ at the side of the chain. After this grate-bar has been removed, the others can be removed one at a time by separating them until their lateral projections are disengaged. One of the advantages of this form of my invention resides in the fact that the grate-bars can expand and contract while the grate is in operation without affecting the cross-bars which carry them. Moreover, if two adjacent grates become stuck or rusted together, they may be easily separated and independently removed and replaced. Again, each grate-bar may be separately removed and replaced without its being necessary to remove the remaining bars.

Referring now to the species of my invention illustrated in Figs. 1 to 5, this form differs from that illustrated in the remaining figures, in that the grate-bars $1^c$ are first hooked upon a single cross-bar $2^a$ as shown in dotted lines at the left in Fig. 1. The grate-bar is then rotated about its carrying cross-bar until it rests upon the second cross-bar $2^b$. This is accomplished by giving a special shape to the hook-like projections $3^b$ and by a particular location of the forward crosspiece or carrier $2^a$. By these means, the grate-bars are firmly held in place against lengthwise displacement on their carriers without the assistance of the rear crosspieces $2^b$. The crosspiece $2^b$, however, holds the grate-bar when it is returning along the lower path of the chain and prevents it from rotating too far. This rotation of the grate-bar has for its object to provide a free supply of air to the fuel on the upper grate-bars and to prevent adjacent grate-bars from sticking together. The grate-bars are removed and replaced when in front of the forward drum 5. Suitable means are provided for holding the grate-bars while rounding the rear drum. These means may be widely varied. In the form illustrated, a fixed guide wall 11 (Fig. 1) is used for the purpose. In order to keep the lower surface of the hanging grate-bars free from ashes, suitable means are provided, preferably in the form of inclined guide plates 12 mounted upon the cross-bars $2^b$. The shape of the grate-bar may be widely varied. The lateral projections of the modified grate-bars $1^d$ shown in Figs. 3 to 5 are so inclined in the direction of the grate-bars that they will not collide when the grate-bars turn. Each bar may thus be removed by sliding it in the direction of its length after turning it through the required angle.

In a preferred embodiment of my invention I construct the grate-bars so that they will present an unbroken floor while traveling on their upper path and will pass on and off the chain-drums without interference. The ends of grate-bars that project at some distance from the links which carry them are apt to collide with adjacent ends of grate-bars when passing on and off the chain-wheels. To avoid this difficulty, as clearly shown in Figs. 10 and 11 I provide the ends of the bars with reëntrant angles $a$ and coöperating inclined, cutaway projections $1^a$ as clearly illustrated in the drawings. The projections 13 at one end of the grate-bar are provided with circular arcs $13^a$ the center of the circle being the pivot 14 at the corresponding end of the guide link carrying the grate-bar. In this form each grate-bar $1^c$ is carried by two bearers or cross-bars $2^c$ of U-section mounted at one end on one link $10^a$. The link $10^b$ pivotally connected to the end of the link $10^a$ nearest the said projection 13 of the appertaining grate-bar is of L-shape and carries a cross-bar $4^a$ which locks the appertaining grate-bar on the upper and lower runways of the chain, but automatically unlocks it at the chain-wheels $5^a$ and $6^a$. At the rear chain-wheel $6^a$ each grate-bar is locked in turn by one of the projections $7^a$, while each grate-bar can be removed lengthwise from the chain at the front chain-wheel $5^a$. Owing to the center of the arc $13^a$ being the described pivot 14, when a grate-bar rounds the front chain-wheel the projection 13 slides smoothly against its appertaining cross-bar $4^a$ and is locked thereby when the grate-bar is horizontal. Fuel is supplied through the feed hopper 15. At the rear end of the grate is provided a scraper 16 whereby clinker or ash is conveyed to the trap door 17. The length of the grate-bars may equal that of the links or it may be double the length (Figs. 6 to 9), or it may be increased.

Having thus described my invention, its operation will be clear without further explanation.

It will be understood that many changes may be made in the construction and arrangement of the parts without departing from the principle of the invention.

What I claim and desire to secure by Letters Patent is:—

1. In a chain-grate, the combination of a chain, a plurality of carriers secured to the chain, a plurality of detachable grate-bars carried by said carriers, and means for securing said bars to the carriers during a portion only of the travel of the chain, the grate-bars being automatically unlocked from the carriers during another portion of the travel of the chain to permit removal of the bars.

2. In a chain-grate, the combination of a chain having a plurality of links, a plurality of carriers secured to the links, a plurality of grate-bars carried by the carriers, and means for intermittently locking said grate-bars to said carriers during a portion only of the travel of the chain, the grate-bars being intermittently unlocked from said carriers during another portion of the travel of the chain to permit removal of the bars.

3. In a chain-grate having a plurality of links, a plurality of carriers secured to said links, a plurality of removable grate-bars, securing means for each grate-bar for detachably securing said bar to its carrier so as to permit its removal in a direction lengthwise of the bar, and means for intermittently locking said grate-bars to their carriers during parts of the travel of the chain, said bars being unlocked from said carriers during other parts of their travel.

4. In a chain-grate, the combination of a link, a carrier including a cross-bar secured thereto, a lengthwise removable grate-bar mounted on said cross-bar, and means for intermittently locking said grate-bar to said cross-bar during part only of each revolution of said link.

5. In a chain-grate, the combination of a traveling link, a cross-bar secured thereto, a removable and replaceable grate-bar mounted on said cross-bar, one or more projections on said grate-bar for engaging said cross-bar, and means for preventing longitudinal movement of said grate-bar with relation to its cross-bar during part only of each complete revolution of the link.

6. In a chain-grate, the combination of a traveling link, a cross-bar having a projecting portion secured thereto, a removable and replaceable grate-bar mounted on said cross-bar, one or more hook-shaped projections carried by said grate-bar for engaging the corresponding projection on said cross-bar, and means for preventing longitudinal movement of said grate-bar with relation to its cross-bar during part only of each complete revolution of the link.

7. In a traveling chain-grate, the combination of a plurality of links, cross-bars mounted on said links, longitudinally removable and replaceable grate-bars carried by said cross-bars, and stops for said grate-bars to prevent longitudinal displacement thereof with relation to said chain during part only of each complete revolution of said links.

8. In a traveling chain-grate, the combination of a plurality of links, cross-bars mounted on some of said links, removable and replaceable grate-bars carried by said cross-bars, and stops for said grate-bars carried by others of said links, which stops automatically move into position to prevent longitudinal displacement of said grate bars with relation to said chain.

9. In a traveling chain-grate, the combination of a chain having a plurality of links, cross-bars mounted on some of said links, removable and replaceable grate-bars carried by said cross-bars, means for locking said grate-bars to said cross-bars during the travel of said links on their upper and lower paths, a rear chain-wheel around which said chain passes, and means rotating with said wheel for locking said grate-bars to said cross-bars while they are rounding the wheel, said grate bars being unlocked from said cross-bars during part of the revolution of the chain.

10. In a traveling chain-grate, the combination of a chain having a plurality of links, cross-bars mounted on some of said links, removable and replaceable grate-bars carried by said cross-bars, means for locking said grate-bars to said cross-bars during the travel of said links on their upper and lower paths, a rear chain-wheel around which said chain passes, and one or more stops rotating with said wheel for locking said grate-bars to said cross-bars while they are rounding the wheel, said grate bars being unlocked from said cross-bars during part of the revolution of the chain.

11. In a traveling chain-grate, the combination of a chain having a plurality of links, cross-bars mounted on some of said links, removable and replaceable grate-bars carried by said cross-bars, means for locking said grate-bars to said cross-bars during the travel of said links on their upper and lower paths, a rear chain-wheel around which said chain passes, and a plurality of stops carried by said wheel for locking said grate-bars to said cross-bars while they are rounding the wheel.

12. In a traveling chain-grate, the combination of a plurality of links, a cross-bar mounted on one of said links, a removable and replaceable grate-bar having a hook clasping said cross-bar, a projection on said grate-bar, a stop connected to an adjacent link for coacting with said projection and locking the grate-bar, a rear chain-wheel, one or more stops connected to said wheel for coacting with the hook on said grate-bar, after the stop on the link has become disengaged from the said projection, so as to prevent the grate-bar from dropping away from its carrier while rounding the rear chain-wheel.

13. In a traveling chain-grate, the combination of a plurality of links, cross-bars projecting from said links, a plurality of removable and replaceable grate-bars mounted on said cross bars, the adjacent edges of said grate-bars having reëntrant angular portions with circular projections that coöperate with the projecting edge of the adjacent grate-bar so that the bars form an unbroken floor while on their upper path, and turn without interference while going on and off the chain-drums.

14. In a chain-grate, the combination of a chain, a plurality of carriers secured to the chain, a plurality of detachable grate-bars carried by said carriers, and means for securing said bars to the carriers during a portion of the travel of the chain, the grate-bars being automatically unlocked from the carriers during another portion of the travel of the chain, one end of each grate-bar having a reëntrant angle and the other end of each grate-bar being pointed and adapted to intermittently enter into the angle in the adjacent grate-bar.

15. In a chain-grate, the combination of a bearer, a link carrying one end thereof, a grate-bar hooked on the bearer, one end of the grate-bar having a reëntrant angle and a downwardly curved projection, an L-shaped link having one arm pivoted to the former link, the center of the pivot connecting the said links being the center of curvature of the outer edge of the said projection, a cross-bar carried by the other arm of the L-shaped link and adapted to coact with the outer edge of the said projection during part of the travel of the link, links connected to the L-shaped link, a bearer mounted on one of the latter links, and a grate-bar hooked on the latter bearer the latter grate-bar having a pointed end adapted to intermittently enter into the reëntrant angle in the former grate-bar.

In testimony whereof, I affix my signature in the presence of two witnesses.

JOHANN RADEMACHER.

Witnesses:
ARTHUR LE LEAN,
WALDEMAR HAUPT.

---

Copies of this patent may be obtained for five cents each, by addressing the "Commissioner of Patents, Washington, D. C."